(12) United States Patent
Schnieders et al.

(10) Patent No.: US 9,168,952 B2
(45) Date of Patent: Oct. 27, 2015

(54) STEERING ANGLE SENSOR FOR MOTOR VEHICLES

(71) Applicant: TAKATA AG, Aschaffenburg (DE)

(72) Inventors: Axel Schnieders, Karlstein (DE); Markus Stollberg, Hösbach (DE); Holger Franz, Mespelbrunn (DE)

(73) Assignee: TAKATA AG, Aschaffenburg (DE)

( * ) Notice: Subject to any disclaimer, the term of this patent is extended or adjusted under 35 U.S.C. 154(b) by 0 days.

(21) Appl. No.: 14/053,221

(22) Filed: Oct. 14, 2013

(65) Prior Publication Data
US 2014/0103912 A1    Apr. 17, 2014

(30) Foreign Application Priority Data

Oct. 15, 2012 (DE) .......................... 10 2012 109 787

(51) Int. Cl.
| | |
|---|---|
| *G01R 33/06* | (2006.01) |
| *G06F 7/00* | (2006.01) |
| *B62D 15/02* | (2006.01) |
| *G01B 7/30* | (2006.01) |

(52) U.S. Cl.
CPC .......... *B62D 15/021* (2013.01); *B62D 15/0215* (2013.01); *G01B 7/30* (2013.01)

(58) Field of Classification Search
CPC ..... B62D 15/021; B62D 15/0215; G01B 7/30
USPC .................. 324/207.2, 251; 701/42
See application file for complete search history.

(56) References Cited

U.S. PATENT DOCUMENTS

| | | | |
|---|---|---|---|
| 5,930,905 A | 8/1999 | Zabler et al. | |
| 6,420,697 B1 * | 7/2002 | Donner et al. | 250/231.14 |
| 2003/0056583 A1 * | 3/2003 | Schodlbauer et al. | 73/200 |
| 2003/0094054 A1 * | 5/2003 | Font | 73/862.328 |
| 2004/0194560 A1 | 10/2004 | Froehlich et al. | |
| 2009/0031569 A1 | 2/2009 | Schirp et al. | |
| 2009/0188743 A1 * | 7/2009 | Ruetz | 180/446 |
| 2010/0181859 A1 * | 7/2010 | Hirai et al. | 310/156.13 |
| 2013/0093415 A1 | 4/2013 | Moldenhauer | |

FOREIGN PATENT DOCUMENTS

| | | |
|---|---|---|
| DE | 10 2004 021 405 A1 | 7/2005 |
| DE | 10 2006 023 286 A1 | 11/2007 |
| DE | 10 2010 024 782 A1 | 12/2011 |
| DE | 10 2010 052 949 A1 | 5/2012 |
| DE | 10 2010 063 845 A1 | 6/2012 |
| EP | 0 877 916 B1 | 4/2003 |
| EP | 1 132 716 B1 | 5/2007 |
| JP | H11-72302 A | 3/1999 |
| WO | 96/27116 A1 | 9/1996 |

OTHER PUBLICATIONS

Chinese Office Action date of issuing Jul. 2, 2015 for Chinese Patent Application No. 201310481970.3 and English translation of the same.

* cited by examiner

*Primary Examiner* — Jermele M Hollington
*Assistant Examiner* — Farhana Hoque
(74) *Attorney, Agent, or Firm* — Fitch Even Tabin & Flannery LLP

(57) ABSTRACT

A steering angle sensor for motor vehicles for determining the steering angle of a steering element of a steering wheel assembly, which is rotatable during a steering movement is provided. The steering angle sensor comprises a rotatably mounted drive element which during a rotary movement of the steering element likewise performs a rotary movement, and a rotatably mounted driven element which is in engagement with the drive element and is driven by the same. The steering angle is determined by detecting the rotary movement and/or the angle of rotation of the driven element. The drive element and/or the driven element include elastic means via which the drive element and the driven element are braced against each other.

15 Claims, 3 Drawing Sheets

STEERING ANGLE SENSOR FOR MOTOR VEHICLES

CROSS-REFERENCE TO RELATED APPLICATION

This application claims priority under 35 U.S.C. §119 to German Patent Application No. 10 2012 109 787.9 filed on Oct. 15, 2012, the entire content of which is hereby incorporated herein by reference in its entirety.

FIELD OF THE INVENTION

This invention relates to a steering angle sensor for motor vehicles for determining a steering angle of a steering element of a steering wheel assembly, e.g. of a steering wheel and/or an associated steering shaft, which is rotatable during a steering movement.

BACKGROUND

A steering angle sensor as mentioned above, which serves for determining the steering angle of a rotatably mounted steering element of a motor vehicle, e.g. of a steering wheel or an associated steering shaft, comprises a rotatably mounted drive element which during a rotary movement of the steering element likewise performs a rotary movement, and a rotatably mounted driven element which is in engagement with the drive element and is driven by the same. The steering angle is determined by detecting the rotary movement and/or the angle of rotation of the driven element.

The steering angle sensor for example can serve the determination of the steering angle of a steering wheel of a motor vehicle. For this purpose, the steering angle sensor normally is mounted in the steering column of the motor vehicle and detects e.g. the rotary movement of the steering shaft associated to the steering wheel.

From WO 96/27116 a method and an apparatus for angle measurement of a rotatable body is known, wherein a gear wheel is mounted on the axle of the rotatable body, which is coupled with two further gear wheels and drives the same for rotation. The angles of rotation of the two further gear wheels are measured by means of two periodic angle sensors. The angle sensors are connected with an electronic evaluation circuit which calculates the angle of rotation of the rotatable body.

The measurement accuracy of the steering angle sensor among other things depends on the precision of the toothing. In general, the engagement of the teeth is not without backlash, which is due to the manufacture of the gear wheels. This backlash additionally is increased by mounting tolerances. In addition, the wear of the gear wheels progressing with time plays a role. Furthermore, the inhomogeneity of the shape and the distribution of the teeth as well as non-circular gear wheels are to be noted, which possibly can lead to linearity errors. This backlash of the gear wheels ultimately leads to measurement errors of the steering angle sensor. In the case of a reversal of the direction of rotation of the gear wheel carrying the sensor this error manifests itself as hysteresis error.

As due to these factors the measurement result of the steering angle sensor is subject to error, wherein the error not necessarily is a systematic error, it is desirable to reduce the backlash of the gear wheels, in order to increase the measurement accuracy of the steering angle sensor.

For this purpose, EP 1 132 716 B1 proposes a position sensor as described above, in which the driven gear wheels in addition are pulled or urged radially to the center of the driving gear wheel by means of spring-elastic tension bars. The driven gear wheels are coupled with a movable, more exactly a rotating part of a rotary position sensor, which cooperates with a stationary part of the rotary position sensor, in order to determine the angle of rotation of the rotating part of the rotary position sensor and thus of the steering element. In this device it is disadvantageous that the driven gear wheels and the rotating parts of the rotary position sensors are radially shiftably mounted in a plane which extends orthogonally to the direction of extension of the axes of rotation. Accordingly, the axis of rotation of the movable parts is not stationary with respect to the stationary parts of the rotary position sensor, so that measurement errors are inevitable, even if the engagement of the teeth now is without backlash and mounting tolerances are compensated. At least the wear of the gear wheels progressing with time and the above-mentioned inhomogeneity of the teeth and gear wheels still lead to measurement inaccuracies. The fact that the clamping frame is an additional component which further reduces the anyway confined installation space also represents a disadvantage.

SUMMARY

It is a problem underlying the invention to indicate a steering angle sensor with increased measurement accuracy.

According to an exemplary embodiment of the invention, the drive element and/or the driven element include elastic means, via which the drive element and the driven element are braced against each other. Due to bracing, the backlash between the drive element and the driven element is reduced in the properly mounted condition, without otherwise disadvantageously impairing the measurement accuracy of the steering angle sensor. In addition, it is avoided that the installation space is reduced in size by the means for reducing the backlash.

The drive element and the driven element each are mounted about an axis of rotation. Both elements each comprise an engagement region, in order to be in engagement with each other.

The elastic means for example on the one hand support on a base body of the driven element and/or drive element, via which the driven element or the drive element is rotatably mounted on a bearing element, and on the other hand act on the engagement region of the corresponding element, in order to brace the same against the respective other element.

The drive element can non-rotatably be connected with the steering element, e.g. in the form of a steering shaft, and together with the same be rotatably mounted, whereas the driven element is rotatably mounted on a rigid bearing element. The arrangement ensures that the axes of rotation of the drive element and the driven element cannot radially be shifted against each other. On the other hand, the engagement region of the driven element and/or the drive element is radially shiftable with respect to the corresponding axis of rotation by the elastic means. The radial shiftability of the engagement region of the one element with respect to its axis of rotation allows that the engagement region of this one element can be braced against the other element.

The base body of the driven element and the drive element is radially immovably mounted with respect to the axis of rotation of the driven element or the drive element. Accordingly, the engagement region of the driven element and/or the drive element is radially shiftable with respect to the respective base body by the elastic means.

To achieve that the engagement region of the driven element and/or the drive element, however, actually is pretensioned against the respective other element by the elastic means, it is also expedient that the distance between the axis of rotation of the drive element and the axis of rotation of the driven element is smaller than the sum of the radii of the drive element and the driven element, which each are designed rotationally symmetrical with respect to their axis of rotation. In the properly mounted condition, the elastic means thus are deformed and pretension the engagement region of the driven element and/or the drive element against the respective other element.

For determining the steering angle of the steering element, the steering angle sensor comprises an assembly to be scanned and a scanning unit, which cooperate with each other. The assembly to be scanned for example is carried by the base body of the driven element. Accordingly, the assembly to be scanned rotates with the base body of the driven element about its axis of rotation. Preferably, the unit to be scanned is incorporated into the base body of the driven element. The assembly to be scanned is radially immovably mounted with respect to the axis of rotation of the driven element. The scanning unit is stationarily arranged with respect to the axis of rotation of the driven element. This means that the single movement which the assembly to be scanned can perform relative to the scanning unit is a rotary movement about the axis of rotation of the driven element. Thus, it can be ensured that apart from the rotation of the assembly to be scanned about the axis of rotation of the driven element no further relative movement is possible between the assembly to be scanned and the scanning unit. Due to this precaution it is achieved that the measurement result of the steering angle sensor at least cannot be adulterated by undesired movements of the assembly to be scanned. It is also conceivable that the scanning unit together with the assembly to be scanned is shiftable along the axis of rotation of the driven element, wherein the distance between the scanning unit and the assembly to be scanned substantially remains constant. This shiftability for example can be advantageous during assembly of the steering angle sensor in a motor vehicle.

Preferably, the assembly to be scanned comprises a magnetic assembly. Alternatively, e.g. an inductive (or possibly optical) assembly also is conceivable. The magnetic assembly for example is formed ring-shaped. For example, the assembly is formed cylindrical or as disk. The magnetic ring can be enveloped by the material of the base body of the driven element.

Furthermore, the magnetic assembly can be mounted in a flux ring. In this case, the elastic means for example support on the flux ring and act on the engagement region of the driven element. Preferably, the flux ring axially protrudes beyond the magnetic assembly. Furthermore, the scanning unit axially immerses into the flux ring. Due to this measure, the magnetic flux of the magnetic assembly is bundled advantageously and a magnetic field as homogeneous as possible is produced.

It is also conceivable that the flux ring and the elastic elements are made of the same material. For example, the elastic means can be punched out and bent out of the flux ring, so that the flux ring and the elastic means form one unit. The manufacturing method of the driven element thereby can be simplified. The flux ring preferably comprises a magnetic material, whereby the assembly to be scanned advantageously is shielded against external magnetic interference fields.

The scanning unit preferably comprises a GMR sensor (GMR for "giant magnetoresistance"). Alternatively, Hall or XMR sensors (XMR for X-magneto-resistive) also are usable. The generic term XMR sensors for example also covers AMR ("anisotrope-magneto-resistive"), TMR ("tunnel-magneto-resistive") and CMR sensors (CMR for "colossal-magneto-resistive"). Depending on the nature of the assembly to be scanned, optical or inductive sensors also can be used.

According to one exemplary embodiment, the drive element and the driven element are formed as gear wheels. The engagement region via which the elements cooperate then is the toothing.

Preferably, the steering angle sensor comprises at least two driven elements, wherein each driven element carries an assembly to be scanned. This has the advantage that the measurement error is reduced further and the precision of the steering angle sensor thus is increased. In general, it is provided that the driven element includes the elastic means. However, the drive element or even the driven element and the drive element can comprise the elastic means.

BRIEF DESCRIPTION OF THE DRAWINGS

The invention will be described in detail below with reference to exemplary embodiments in conjunction with the drawings.

DETAILED DESCRIPTION

Figure 1:
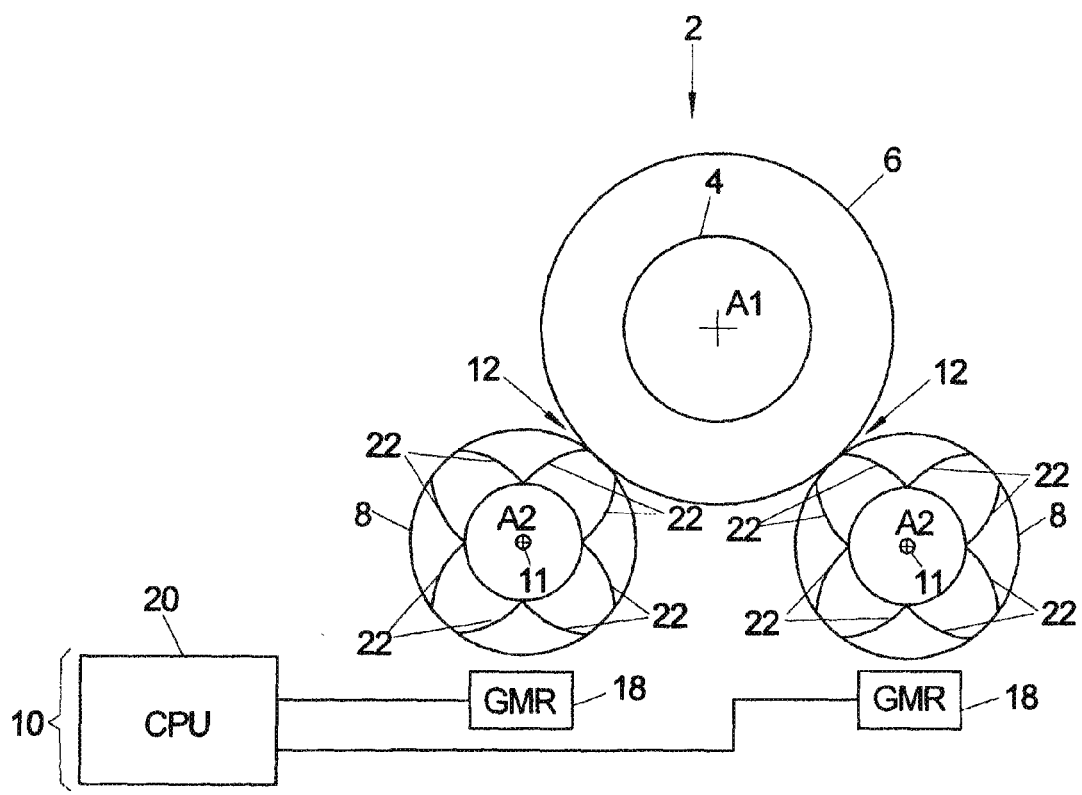
FIG. 1 shows a schematic representation of a steering angle sensor with one drive element and two driven elements.

FIG. 1 schematically shows a steering angle sensor 2 according to an embodiment of the invention. In the exemplary embodiment, the steering angle sensor 2 is provided on a rotatable steering element in the form of a steering shaft 4 for detecting the steering angle of the steering element. Alternatively, the steering angle sensor 2 can e.g. also directly be associated to a steering wheel. Depending on the type of vehicle, the steering wheel and hence also the associated steering shaft are rotatable in an angular range between ±720° and ±1440°. Preferably, the steering angle range is ±1080°, which corresponds to ±3 revolutions of the steering wheel and the associated steering shaft. Therefore, the steering angle sensor 2 is formed such that steering angles which are greater than 360° also can be measured.

The steering angle sensor 2 according to the embodiment shown in FIG. 1 comprises a drive element 6, two driven elements 8 which are in engagement with the drive element 6, and a scanning unit 10 which measures the rotary movement of the driven elements 8.

The drive element 6 is rotatably mounted about an axis of rotation A1 together with the steering shaft 4. For this purpose, the drive element 6 is non-rotatably connected with the steering shaft 4. The drive element 6 also can rigidly be connected with the steering shaft 4. In addition, it is also possible that the drive element 6 is non-rotatably or rigidly connected with the steering wheel. The driven elements 8 each are rotatably mounted on a stationary bearing element 11 along an axis of rotation A2. The term "stationary" should express that no movement is made in the reference system of the steering angle sensor. In the case of a rotary movement of the steering shaft 4 about the axis of rotation A1, the drive element 6 and, due to its engagement with the driven elements 8, also the driven elements 8 hence are put into rotation.

The drive element 6 and the driven elements 8 each include an engagement region 12, via which the drive element 6 is in engagement with each of the driven elements 8. Via the engagement regions 12, a rotary movement of the drive element 6 is transmitted to the driven elements 8. In the exemplary embodiments shown in the Figures, the drive element 6 and the driven elements 8 are designed as gear wheels with a toothing as engagement region 12. The toothing comprises an outer ring 13 which carries a tooth profile 14 (see FIGS. 2 and 4). Due to the positive cooperation of the gear wheels, a mutual slipping of the drive element 6 and the driven elements 8 and thus an adulterated signal of the steering angle sensor is avoided. Alternatively, the drive element 6 and the driven elements 8 can e.g. also be formed as toothed belt. For particular applications, a friction-gear transmission also can be used.

The gear ratio between the drive gear wheel 6 and the one driven gear wheel is other than the gear ratio between the drive gear wheel 6 and the other driven gear wheel 8. The gear ratios are chosen such that the driven gear wheels 8 rotate more than once during one revolution of the drive gear wheel.

As explained below, the two driven elements 8 each carry an assembly which serves for detecting the angle of rotation. Correspondingly, two signals are measured which depend on the rotation of one driven element 8 each and which serve the calculation of the angle of rotation of the steering shaft 4. One driven element 8 alone only can resolve a limited angular range of e.g. 360°. The steering shaft 4, however, can perform ±3 revolutions, i.e. be rotated by ±1080°. To be able to cover this steering angle range, and above all to be able to distinguish whether the steering shaft 4 and the associated steering wheel were rotated once or several times, the second driven element 8 is required. By applying the Nonius principle, the exact angle of rotation can thus be calculated. In addition, even after a currentless operation of the steering angle sensor 2 the current steering angle can be indicated, which with a single driven element 8 would only be possible to a limited extent for a range of e.g. 0° to 360°. Accordingly, an unambiguous value which results from the individual signals of each assembly is associated to each steering angle of the steering shaft 4.

The driven elements 8 each comprise an assembly 15 to be scanned, which is associated to the scanning unit 10 and serves the determination of the steering angle of the steering shaft 4. The assemblies 15 to be scanned rotate with the driven elements 8 about the corresponding axis of rotation A2, which is stationary with respect to the scanning unit 10. The (only) possible relative movement of the assembly 15 to be scanned with respect to the scanning unit 10 accordingly consists in the rotation of the assembly 15 to be scanned about the axis of rotation A2. The steering angle of the steering shaft 4 is determined by detecting the rotary movement and/or the angle of rotation of the driven elements 8 with the assemblies 15 to be scanned.

The assemblies 15 to be scanned are carried by one base body 16 each of the driven elements 8. Via the base body 16 the respective driven element 8 is mounted on the associated bearing element 11. Preferably, the assemblies 15 to be scanned comprise a magnetic structure. Alternatively, e.g. an inductive (or possibly optical) scannable structure also is conceivable. The term magnetic structure comprises one-part and multi-part magnets of any shape. The orientation of the magnetic field or the change in the orientation is detected by the scanning unit 10 and converted into a steering angle information. The scanning unit 10 comprises two GMR sensors 18 (GMR for "giant magnetoresistance"). The GMR sensors 18 are arranged such that one GMR sensor 18 each interacts with a magnetic structure. Preferably, the GMR sensors 18 are arranged at an appropriate distance from the plane defined by the rotating assemblies 15 to be scanned above or below the assemblies 15 to be scanned. The signal detected by the GMR sensors 18 is forwarded to a processor 20 which calculates the steering angle information.

Due to the use of two driven elements 8, i.e. of two assemblies 15 to be scanned, the steering angle sensor 2 can operate as multiturn sensor or "True Power On" sensor according to the Nonius measurement principle. Accordingly, after switching on the steering angle sensor 2, the unambiguous angular position of the steering element, e.g. of the steering wheel and/or the associated steering shaft, can be determined within the measurement range. In addition, a redundancy is obtained after switching on, i.e. both angular signals are in relation to each other. Since steering angle sensors are to be regarded as safety-critical, the redundancy here has a favorable influence on the detection of error conditions.

It is, however, also possible to operate the steering angle sensor 2 only with one of the two assemblies 15 to be scanned or to provide only one driven element 8 with an assembly 15 to be scanned. In addition, it is conceivable to provide more than two driven elements 8 and assemblies 15 to be scanned, if this is advantageous for a specific use of the steering angle sensor 2.

The driven elements 8 are provided with elastic means 22, which brace the engagement regions of the driven elements 8 against the drive element 6. Due to the elastic means 22, the constructionally required backlash between the drive element 6 and the driven elements 8 and thus a hysteresis which can occur due to this backlash is reduced. In general, the measurement accuracy of the steering angle sensor 2 is increased by bracing the drive element 6 with the driven elements 8.

The elastic means 22 are arranged such that the engagement region 12 of each driven element 8 is radially movable due to the effect of the elastic means 22 with respect to the axis of rotation A2 of the corresponding driven element 8. This means that the elastic means 22 extend between the base body 16 of the driven element 8 and the engagement region 12 of the driven element 8. It thus is achieved that the base body 16 and the assembly 15 to be scanned is radially immovably mounted on the bearing element 11, while the engagement region 12 of the driven element 8 is radially shiftable with respect to the base body 16 and the axis of rotation A2. In the properly mounted condition, the drive element 6 and the driven elements 8 are arranged such that the distance between the axis of rotation A1 of the drive element 6 and the axes of rotation A2 of the driven elements 8 is chosen smaller than the sum of the radii of the drive element 6 and of the driven element 8. Due to the elastic means 22 and the choice of the distances between the axes of rotation A1, A2 it is achieved that in the properly mounted condition of the drive element 6 and of the driven elements 8 the engagement region 12 of the driven elements 8 is braced against the drive element 6 by the elastic means 22. Accordingly, the elastic means 22 provide for a backlash compensation between the drive element 6 and the driven elements 8, wherein the assembly 15 to be scanned is radially immovable with respect to the scanning unit 10.

Figure 2:
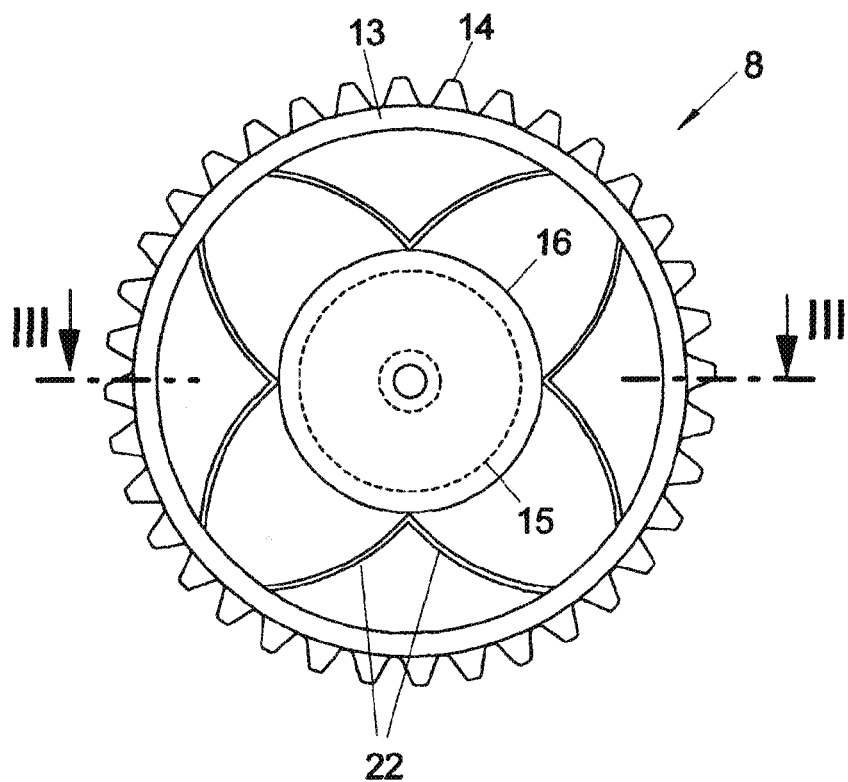
FIG. 2 shows a top view of a driven element according to a first embodiment of the invention.
Figure 4:
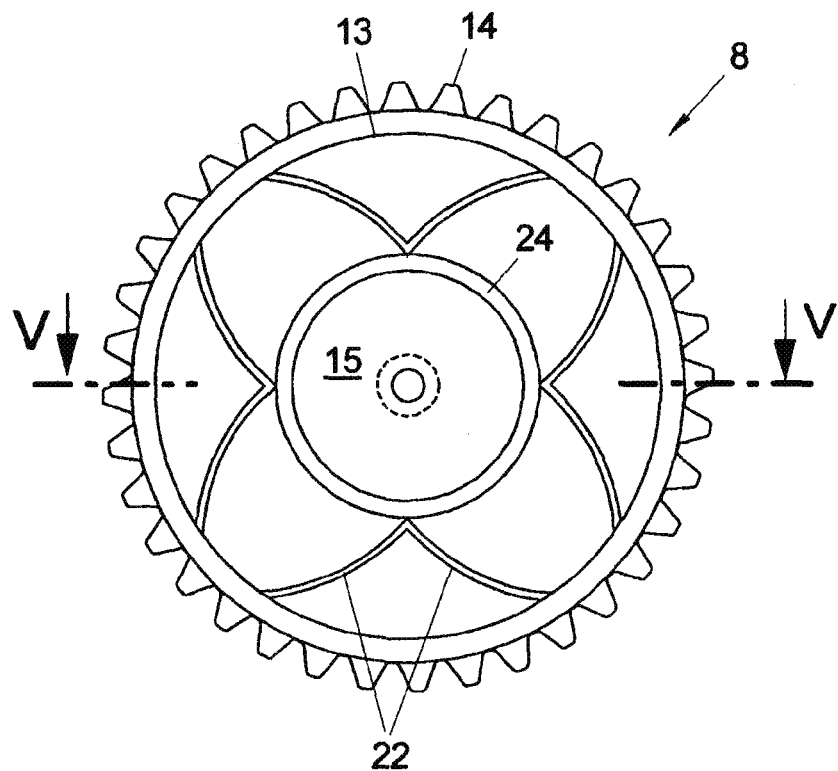
FIG. 4 shows a top view of a driven element according to a second embodiment of the invention.

In FIGS. 1, 2 and 4 the elastic means 22 are formed as spring-elastic webs which symmetrically extend around the circumference of the base body 16. The elastic means 22 are fabricated of a metal and/or a plastic material. Preferably, the elastic means 22 include a metallic material. By way of example, eight spring-elastic webs per driven element 8 are shown in the Figures. The number of the webs, however, is variable depending on the application of the steering angle sensor 2. As an alternative to the spring-elastic webs it is also possible to fabricate the elastic means 22 of an intrinsically elastic material which annularly surrounds the base body and extends between the base body 16 and the engagement region 12 of the driven element 8. Such material for example is an elastomer.

According to one variant, not only the driven elements 8, but in addition also the drive element 6 includes the elastic means 22. According to a further variant, not the driven elements 8, but the drive element 6, include the elastic means 22.

Figure 3:
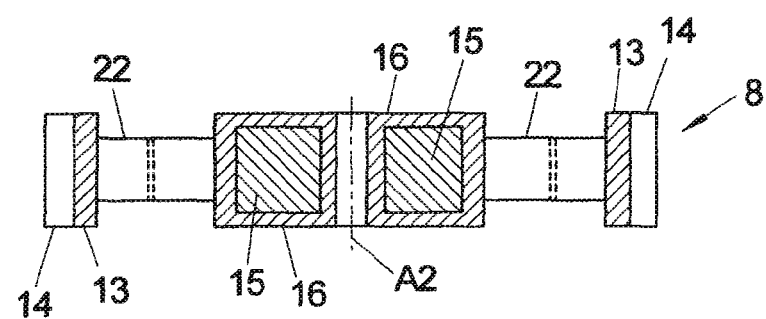
FIG. 3 shows a cross-section through the driven element of FIG. 2.

FIG. 2 shows a top view of the driven element 8 according to a first embodiment of the invention. The assembly 15 to be scanned, which is formed as magnetic structure, is arranged annularly around the axis of rotation A2 of the driven element 8. The assembly to be scanned for example can be formed as disk or as cylinder. The assembly 15 to be scanned is embedded into the base body 16 (see FIG. 3). The base body 16 preferably consists of a plastic material, which is injected into the assembly to be scanned. Alternatively, the assembly 15 to be scanned is attached to the base body 16 by fastening means, such as for example clamps or hooks. On the radial outer surface of the assembly 15 to be scanned a plastic layer is provided, to which the elastic means 22 are attached for example by injection molding.

Figure 5:
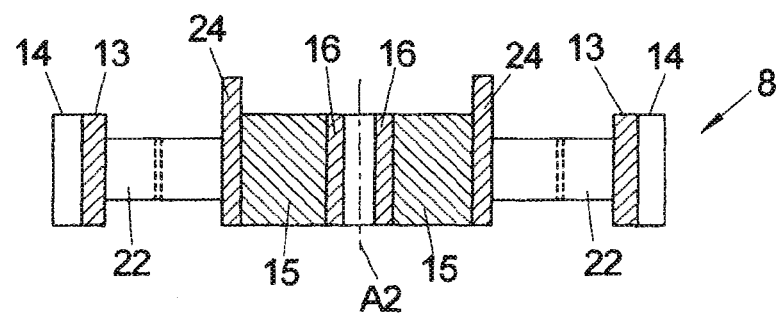
FIG. 5 shows a cross-section through the driven element of FIG. 4.

FIG. 4 shows a top view of the driven element 8 according to a second embodiment of the invention. The second embodiment differs from the first embodiment in that the assembly 15 to be scanned, which is formed as magnetic structure, is not embedded into the base body 16. Rather, the ring-shaped assembly 15 to be scanned extends around the base body 16 and is mounted in a cylindrical flux ring 24 (see FIG. 5). The flux ring 24 axially protrudes beyond the assembly 15 to be scanned, in order to bundle the magnetic flux of the magnetic structure and generate a magnetic field as homogeneous as possible. The effect of the flux ring 24 consists in reducing the magnetic resistance of the magnetic structure and concentrate the magnetic field lines extending between the poles. In addition, the flux ring 24 serves to shield the assembly 15 to be scanned against external magnetic interference fields. Advantageously, the scanning unit 10 partly immerses into the flux ring 24 (not shown) and thus into the bundled homogeneous magnetic field, in order to increase the measurement accuracy of the scanning unit 10. The flux ring 24 carries the elastic means 22 on its radial outer surface. The flux ring 24 comprises a magnetically conductive material, such as for example iron. According to one variant, the elastic means 22 are fabricated of the same material as the flux ring. In addition, the flux ring 24 can be overmolded by a plastic material. The plastic material increases the mechanical stability of the flux ring 24. According to one variant, the elastic means 22 and the flux ring are formed in one piece. For example, the elastic means 22 are punched out and bent out of the flux ring 24.

What is claimed is:

1. A steering angle sensor for motor vehicles for determining the steering angle of a steering element of a steering wheel assembly, which is rotatable during a steering movement, comprising:
    a rotatably mounted drive element, which during a rotary movement of the steering element likewise performs a rotary movement, and
    a rotatably mounted driven element, which is in engagement with the drive element and is driven by the same,
    wherein by detecting the rotary movement and/or an angle of rotation of the driven element the steering angle is determined,
    wherein the drive element and/or the driven element include elastic means via which the drive element and the driven element are braced against each other,
    wherein the drive element and the driven element each are rotatable about an axis of rotation, and
    wherein the drive element and the driven element each include an engagement region via which the drive element and the driven element are in engagement with each other and the engagement region of the driven element and/or the drive element is radially movable with respect to its axis of rotation and that the engagement region is pretensioned against the other one of those two elements by the elastic means.

2. The steering angle sensor according claim 1, wherein the drive element and the driven element each include a base body via which the respective element is rotatably mounted on a bearing element.

3. The steering angle sensor according to claim 2, wherein the base body of the drive element and/or the driven element is radially immovably mounted with respect to its axis of rotation and that its engagement region is radially movable with respect to the base body.

4. The steering angle sensor according to claim 2, wherein the base body of the driven element includes an assembly to be scanned for determining the steering angle.

5. The steering angle sensor according to claim 4, wherein the assembly to be scanned is designed as a magnetic assembly.

6. The steering angle sensor according to claim 4, wherein the assembly to be scanned is formed ring-shaped.

7. The steering angle sensor according to claim 4, wherein the assembly to be scanned is arranged in a flux ring.

8. The steering angle sensor according to claim 7, wherein the flux ring protrudes axially beyond the assembly to be scanned.

9. The steering angle sensor according to claim 4, wherein the steering angle sensor includes a scanning unit which for determining the steering angle cooperates with the assembly to be scanned.

10. The steering angle sensor according to claim 9, wherein the assembly to be scanned along with the driven element is rotatably mounted about its axis of rotation and radially immovably with respect to the axis of rotation and that the scanning unit is stationarily arranged with respect to the axis of rotation of the driven element.

11. The steering angle sensor according to claim 9, wherein the scanning unit comprises a GMR sensor, a Hall sensor or an XMR sensor.

12. The steering angle sensor according to claim 1, wherein the drive element and the driven element each include a base body via which the respective element is rotatably mounted on a bearing element and the elastic means on the one hand support on the base body of the driven element and/or drive element and on the other hand act on the engagement region of this element, in order to brace the drive element and the driven element against each other.

13. The steering angle sensor according to claim 1, wherein the drive element and the driven element each are designed rotationally symmetrical and that the distance between the axis of rotation of the drive element and the axis of rotation of the driven element is smaller than the sum of the radii of the drive element and the driven element, in order to brace the drive element and the driven element against each other via the elastic means.

14. The steering angle sensor according to claim 1, wherein the drive element and the driven element are gear wheels which cooperate via one toothing each as engagement region.

15. The steering angle sensor according to claim 1, wherein the steering angle sensor includes at least two driven elements which are driven by the drive element and the driven elements include the elastic means.

* * * * *